United States Patent [19]

De Leebeeck

[11] Patent Number: 5,595,363
[45] Date of Patent: Jan. 21, 1997

[54] PLASTIC PIPE BEAM SUPPORT

[76] Inventor: Marcel De Leebeeck, 101/4 SOI 8, Maneeya House, Rattanatibet Road, Nonthaburi 11000, Thailand

[21] Appl. No.: 529,333

[22] Filed: Sep. 18, 1995

[51] Int. Cl.$^6$ ............................................. F16L 3/24
[52] U.S. Cl. ............................................. 248/72
[58] Field of Search ............................. 248/72, 65, 73, 248/74.1, 74.4, 229.12, 229.22, 228.3, 228.5

[56] References Cited

U.S. PATENT DOCUMENTS

| | | | |
|---|---|---|---|
| 1,670,902 | 5/1928 | Popps | 248/72 |
| 2,562,562 | 7/1951 | Manasek | 248/228.3 |
| 3,333,799 | 8/1967 | Peterson | 248/72 |
| 4,397,437 | 8/1983 | Madej | 248/72 |

FOREIGN PATENT DOCUMENTS 3406955  2/1984  Germany.

Primary Examiner—Ramon O. Ramirez
Attorney, Agent, or Firm—Brian J. Coyne

[57] ABSTRACT

Apparatus for supporting plastic pipe on or from an I-beam. A pair of oppositely disposed brackets is provided for engaging opposite flanges of the beam. Each of the brackets has a U-shaped base portion that forms a groove adapted to closely engage a flange of the beam, and a lug portion having a recess for receiving and supporting a pipe. The apparatus also includes threaded rods connecting the lug portions of the brackets for moving the brackets towards and apart from one another, thereby reversibly securing the brackets to the flanges. An angle iron is mounted to at least one bracket by the threaded rods. Plastic pipe positioned within the recesses of the brackets is attached to the beam by a U-bolt with threaded ends inserted through apertures in the angle iron and secured by matching nuts.

2 Claims, 5 Drawing Sheets

PLASTIC PIPE BEAM SUPPORT

TECHNICAL FIELD

This invention relates to apparatus for supporting a conduit from a beam and more particularly to apparatus for supporting plastic pipe on or from a flange of a structural steel supporting member, such as an angle iron or I-beam.

BACKGROUND ART

A plurality of horizontal I-beams supported by vertical columns has been widely used to support horizontal runs of plastic pipe, as illustrated in FIG. 1. As shown in FIG. 2, the conventional manner for securing plastic pipe to an I-beam positioned transverse to the longitudinal axis of the pipe has been to drill a pair of holes in a flange of the I-beam to receive the threaded ends of a U-bolt, place an arcuate wear plate on the surface of the flange between the holes, lay the pipe on the wear plate, insert the threaded ends of the U-bolt through the holes, and wind nuts up the threaded ends until the U-bolt firmly secures the pipe to the beam. The requirement for drilling holes in I-beams made this method relatively slow, awkward, and labor-intensive.

Manasek, U.S. Pat. No. 2,562,562, disclosed a pipe and conduit supporting clamp, comprising two laterally spaced C-shaped clamp bodies transversely connected together at adjacent ends by an arcuate portion. A screw was threaded through the middle of the arcuate portion. When the pipe was placed on a top surface of a flange of a structural member, the clamp bodies engaged a bottom surface of the flange, the arcuate portion partially surrounded the pipe, and advancement of the screw urged the pipe against the top surface of the flange. By inverting the clamp, a pipe could likewise be attached to a bottom surface of a flange of a structural member. Although Manasek's clamp eliminated the need to drill holes in the flanges of structural steel members, Manasek's clamp still required use of wear plates for plastic pipe.

Stange, German Patent No. DE 31 10716, disclosed first and second pairs of clamping jaws. Each of the jaws had a clamp groove. The jaws of the first pair engaged a first flange of an I-beam in spaced relation, and the jaws of the second, oppositely disposed pair engaged an opposite flange of the beam in similar spaced relation. One jaw of each of the first pair of clamping jaws also had a shoulder with a screw hole for receiving a threaded end of a U-bolt. Tensioning screws connected the oppositely disposed jaws, whereby the jaws could be reversibly secured to the beam. Like Manasek's, Stange's device also eliminated the need to drill holes in the flanges of structural steel members, but still required the use of wear plates for plastic pipe.

Madej, U.S. Pat. No. 4,397,437, disclosed an I-beam clamp comprising a saddle-shaped member for urging a conduit supported on a U-bolt into engagement with an I-beam by the threaded engagement of encapsulated nuts on the threads of the U-bolt. Although Madej's clamp did not require the drilling of holes in an I-beam flange, it was designed for attachment to one flange only of an I-beam, and thus lacked the mechanical stability afforded by devices that simultaneously engage both of the opposite flanges of a beam. Moreover, when used with plastic pipe, Madej's clamp also required insertion of a wear plate between the pipe and the beam.

SUMMARY OF THE INVENTION

There remains a need for a device that will support plastic pipe on or from a structural steel supporting member, such as an I-beam, without requiring the drilling of holes in the member, and without requiring insertion of a wear plate between the pipe and the member. In accordance with the present invention, there is provided apparatus for supporting plastic pipe on or from an I-beam that includes a pair of oppositely disposed brackets for engaging opposite flanges of an I-beam. Each of the brackets has a U-shaped base portion that forms a groove adapted to closely engage a flange of an I-beam, and an upstanding lug portion having an upper margin cut out to form a recess for receiving and supporting a pipe. The apparatus further includes threaded rods connecting the lug portions of the brackets for moving the brackets towards and apart from one another, thereby reversibly securing the brackets to the flanges. There is further provided a U-bolt having threaded ends insertable through apertures in an angle iron attached to one of the brackets, whereby a pipe can be firmly secured within the recesses of the brackets and within the U-bolt. No drilling of holes in the I-beam is required, nor is any wear plate necessary as the pipe does not make contact with the beam.

BRIEF DESCRIPTION OF THE DRAWING

Like reference numerals are used to designate like parts throughout the several views of the drawings, and.

Figure 1:
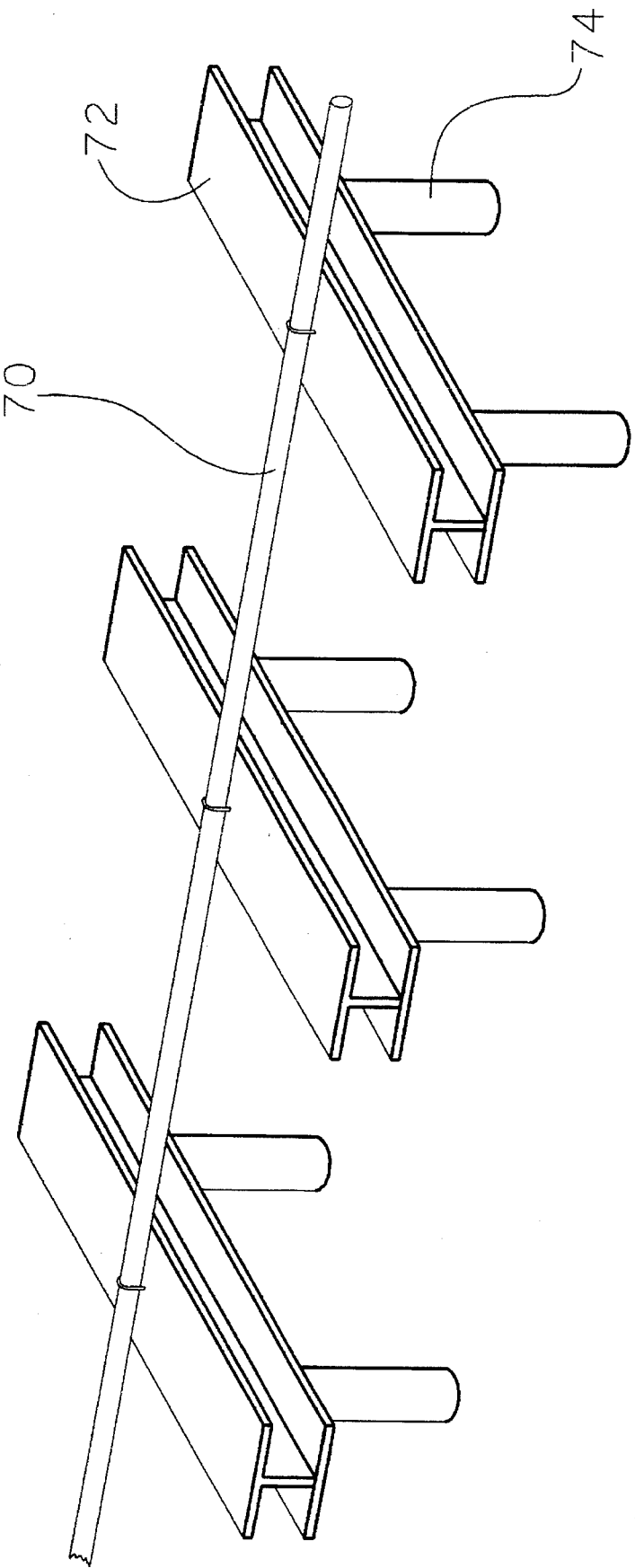
FIG. 1 is an isometric view of a run of plastic pipe 70 supported by a series of transverse I-beams 72 resting on vertical columns 74.
Figure 2:
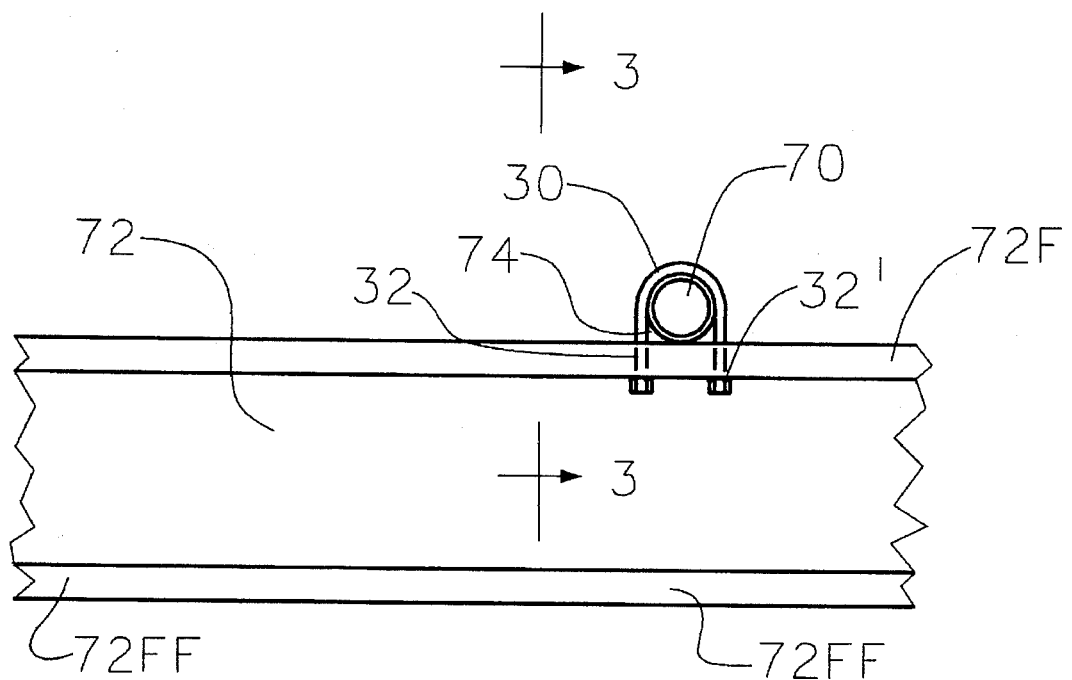
FIG. 2 is a cross-sectional view of plastic pipe 70 supported on an I-beam 72 by a conventional method employing a U-bolt 30 inserted through holes 32, 32' drilled in upper flanges 72F of the I-beam and with a wear plate 84 positioned between the pipe and the beam.
Figure 3:
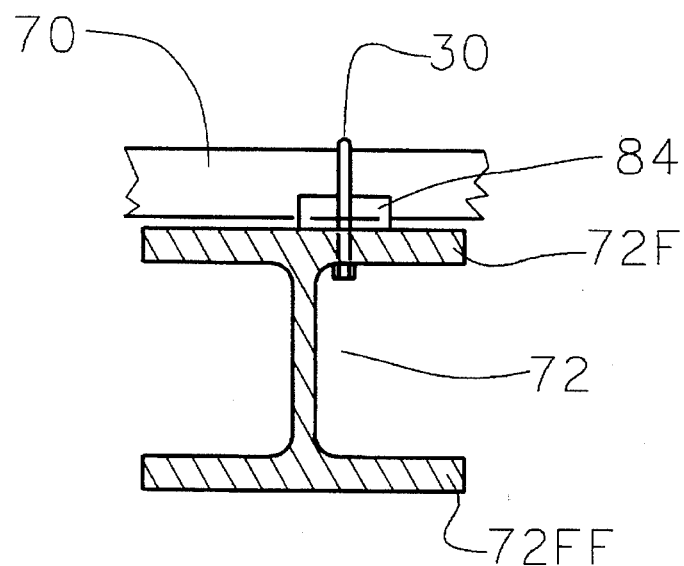
FIG. 3 is a cross-sectional view thereof taken along the lines 3—3 of FIG. 2.
Figure 4:
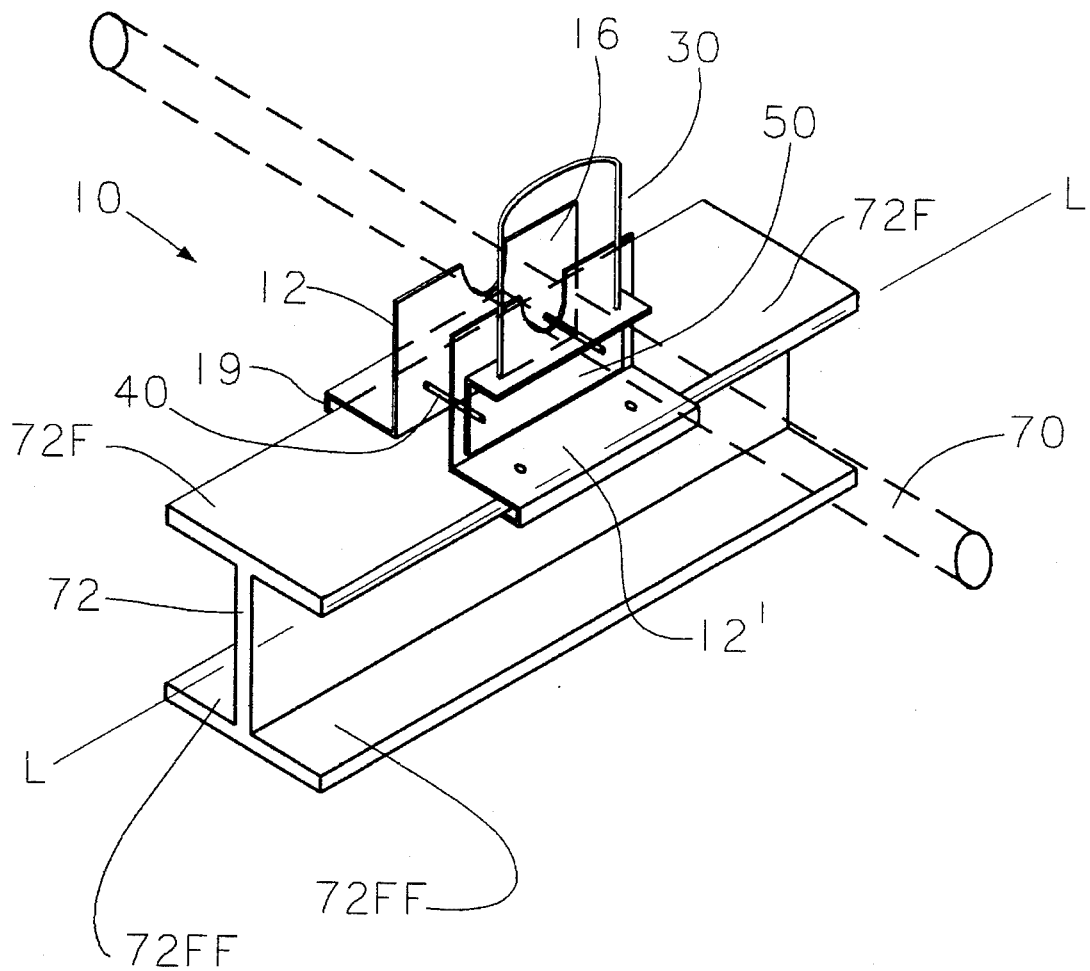
FIG. 4 is an isometric view of the apparatus of the invention attached to an I-beam with a pipe (shown by dashed lines) placed within the apparatus.

The terms "longitudinal" and "longitudinally" shall refer to the direction denoted by the longitudinal axis L of the beam 72 as depicted in FIG. 4; the terms "lateral" and "laterally" shall refer to a direction normal to axis L and parallel to the beam flanges 72F, 72FF.

DETAILED DESCRIPTION OF THE PREFERRED EMBODIMENT

Figure 5:
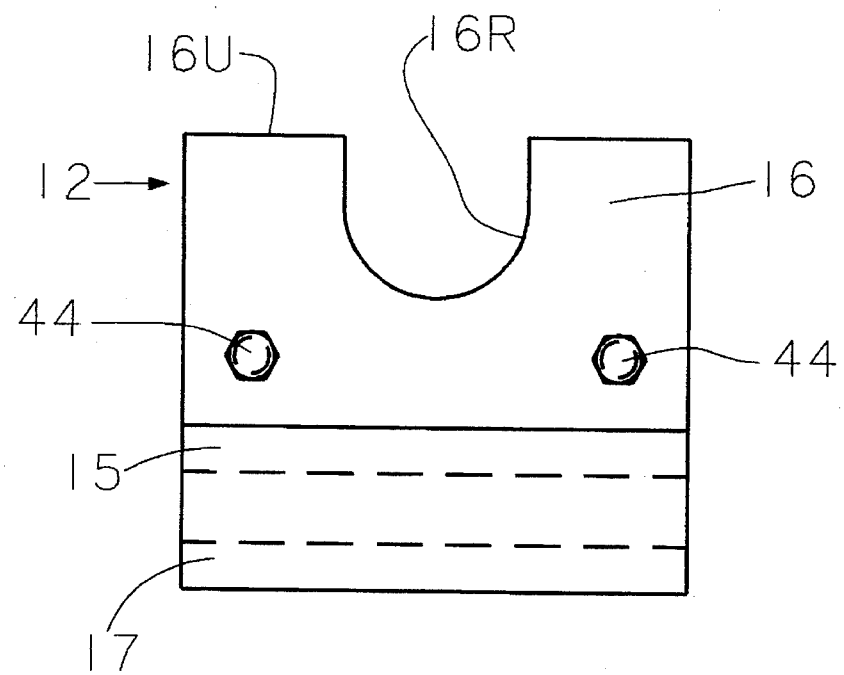
FIG. 5 is a rear elevational views of a first bracket of the apparatus.
Figure 6:
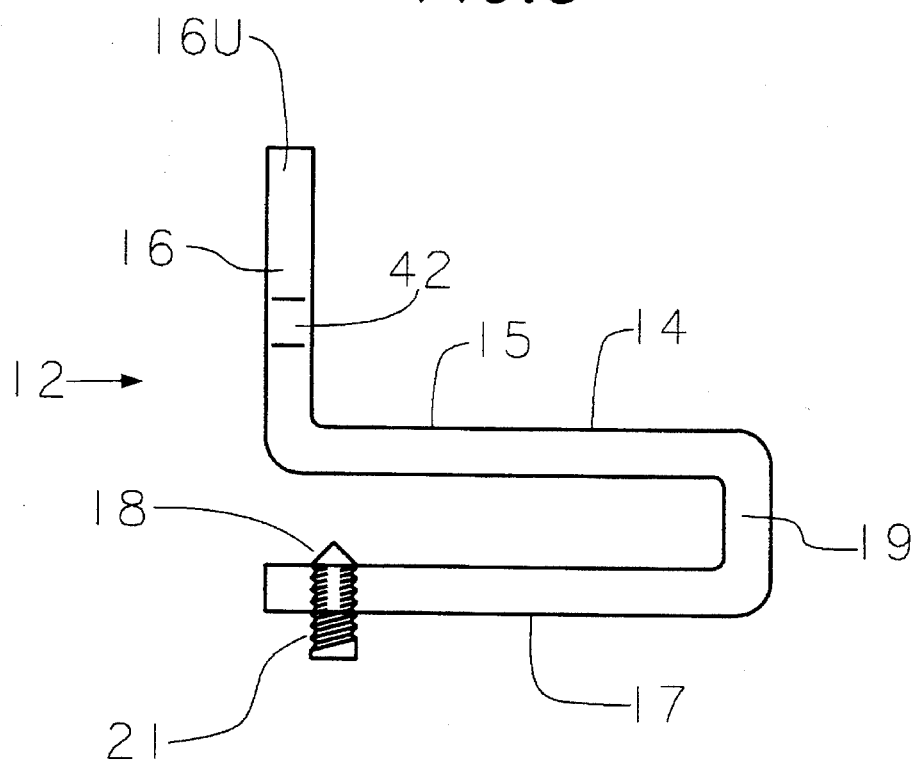
FIG. 6 is an side elevational view thereof.
Figure 7:
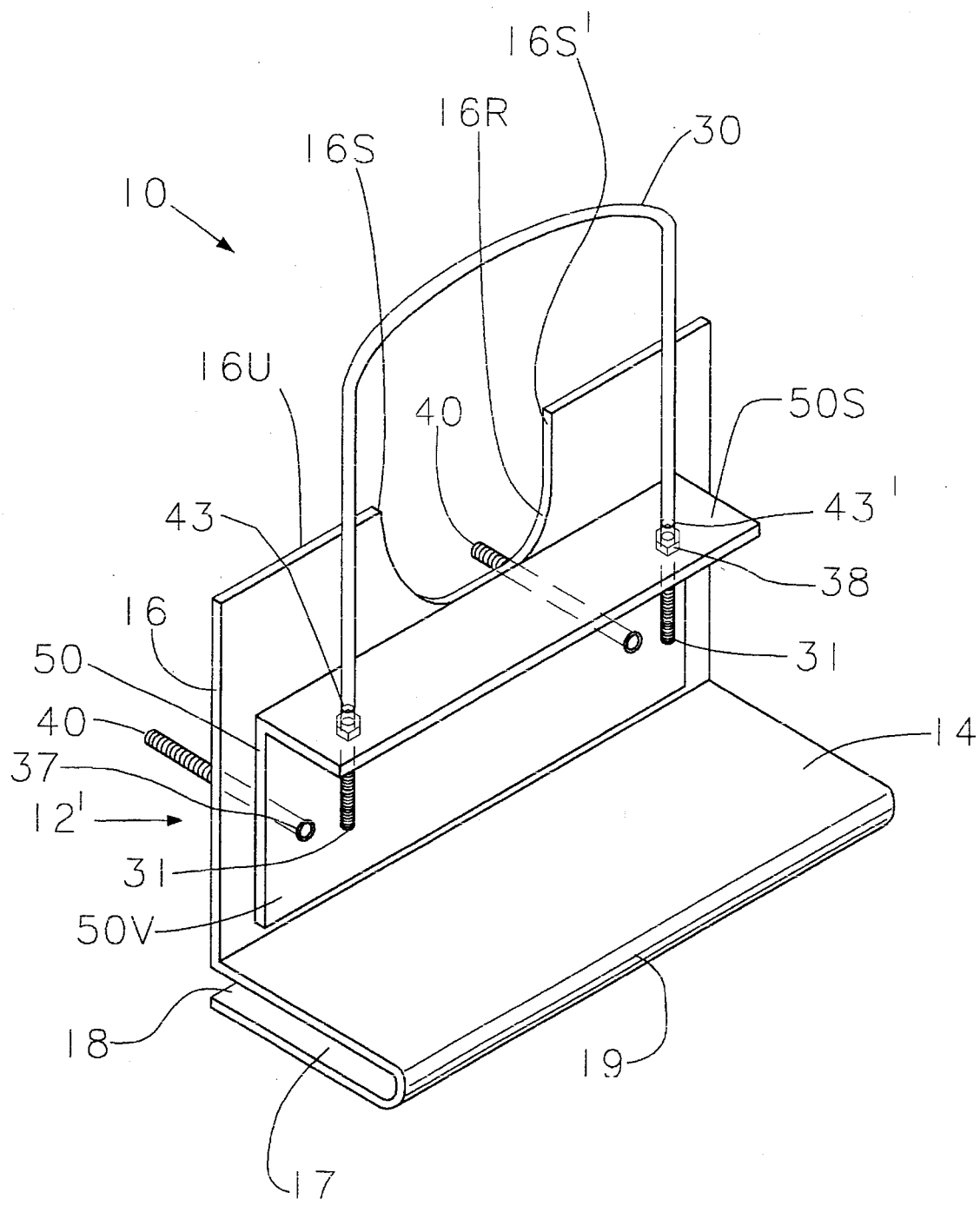
FIG. 7 is an isometric view of a second bracket of the apparatus showing threaded ends of a U-bolt inserted through apertures in an angle bracket mounted thereto by a lateral pair of threaded rods.

Referring to FIG. 4, there is illustrated apparatus, generally designated by the numeral 10, for securing a plastic pipe (shown by dashed lines) to an I-beam 72 having laterally opposite pairs of upper flanges 72F and lower flanges 72FF. The apparatus includes a first bracket 12 and a second bracket 12' that are substantially identical, except as indicated below, and oppositely disposed when mounted on opposite upper flanges 72F of an I-beam 72. Referring to FIG. 6, each bracket 12, 12' includes a U-shaped, horizontal base portion 14, comprising an upper plate 15 and a lower plate 17 joined by a bend 19, that forms a groove 18 adapted to receive and engage a flange 72F of an I-beam 72. Each bracket 12, 12' further includes a flat, upstanding lug portion 16 integral with, and normal to, the base portion 14. As may best be seen in FIG. 5, an arcuate, substantially semicircular recess 16R is cut out of upper margin 16U of lug portion 16. The maximum width of the recess should be slightly greater than the outer diameter of plastic pipe that is to be secured by the apparatus 10 to the beam 72. Optionally, a set screw 21 may be threaded through an aperture in a lower plate 17 of either bracket 12, 12' to reversibly engage a flange 72F, as shown, for example, in FIG. 6.

Referring now to FIGS. 4–7, the apparatus 10 further includes an angle iron 50 for mounting to a lug portion 16 of one or the other of the brackets 12, 12', and a pair of threaded means 40 inserted through a first pair of longitudinally-spaced apertures 37 in vertical support portion 50V of the angle iron 50 and through matching longitudinally-spaced apertures 42 in the oppositely disposed lug portions 16 of the brackets 12, 12' and secured by nuts 44 wound on opposite ends of the threaded means 40. In a preferred embodiment, the threaded means 40 includes threaded rods cut to a length sufficient to span the width of the I-beam 72 and hold the brackets 12, 12' in position on I-beam flanges 72F. Tightening the nuts 44 moves the brackets 12, 12' toward each other, thereby firmly securing the brackets 12, 12' to the I-beam 72, whereas loosening the nuts 44 permits removal of the brackets 12, 12' from the I-beam.

The apparatus 10 further comprises a U-bolt 30 having a pair of threaded ends 31. When the angle iron 50 is mounted on lug portion 16 of bracket 12' underneath cutout 16R, horizontal shelf portion 50S of the angle iron 50 extends longitudinally at least from one side 16S of the cutout to an opposite side 16S' thereof and more than spans the distance between the threaded ends 31 of the U-bolt. After a pipe 70 has been placed over the beam 72 and into the cutout 16R, the U-bolt is inverted and lowered down over the pipe 70, and first and second apertures 43, 43' in shelf portion 50S receive the threaded ends 31 of the U-bolt 30. The U-bolt 30 may then be tightly secured to the pipe 70 by winding nuts 38 up said threaded ends 31.

In use, for supporting a pipe 70 over a horizontal beam 72, the brackets 12, 12' are placed on opposite sides of an I-beam 72 thereof such that I-beam flanges 72F are received within the bracket recesses 18. An angle iron 50 is positioned under cutout 16R of one of the brackets, e.g., bracket 12', and threaded means 40 are inserted through apertures 42 in the lug portions 16 and through apertures in the angle iron. Nuts 44 are then wound onto opposite ends of threaded means 40 until the brackets 12, 12' are secured to the I-beam 72. A plastic pipe 70 is inserted through the recesses 16R of both brackets 12, 12', the U-bolt 30 is inverted and lowered over the pipe 70 such that the threaded ends 31 thereof pass through the apertures 43, 43' of the angle iron 50. Nuts 38 are then wound up the threaded ends 31 to firmly maintain the pipe within the recesses 16R, away from the beam 72, thereby obviating the need for a wear plate. Although the apparatus 10 is herein illustrated with the brackets 12, 12' positioned for supporting a pipe 70 over a horizontal I-beam 72, the brackets 12, 12' could equally well support a pipe 70 below the I-beam 72 by inverting the brackets 12, 12' and angle iron 50 with respect to the orientation shown in FIGS. 4–7, and attaching them to the lower flanges 72FF of the beam 72 by threaded means 40. In that case, a non-inverted U-bolt 30 could be attached to the brackets 12, 12' by nuts 38.

Since the brackets 12, 12' are substantially identical in size and shape, they pack easily for shipping. In combination with a U-bolt 30, angle iron 50 and threaded rods 40 as described, the brackets 12, 12' are quite versatile. First, they can anchor plastic pipe 70 to an I-beam 72 in the manner described, with the pipe positioned either over the beam or under the beam. Second, instead of tightening a U-bolt 30 down over a pipe seated within the cutouts 16R of the brackets 12, 12', the brackets 12, 12' can act as pipe guides if an inverted U-bolt is placed over the pipe and loosely secured to the brackets 12, 12' by double pairs of nuts 33 so that the pipe 70 is free to move within the U-bolt 30. Third, by omitting the U-bolt 30 entirely, the brackets 12, 12' can just serve as supports to bear the weight of a pipe 70 inserted through the bracket cutouts 16R.

The brackets 12, 12' are preferably fabricated from sheet steel and sized to suit plastic pipe of a chosen dimension, larger brackets being required to accommodate pipes of larger outer diameter. Although the angle iron as described above is a component of the apparatus separate from the brackets 12, 12', in an alternative embodiment the angle iron 50 can be incorporated into at least one of the brackets 12, 12' as an integral part thereof, as, for example, by welding the angle iron 50 to a lug portion 16.

Thus, an apparatus according to the concepts of the present invention have been shown and described in sufficient detail to enable one of ordinary skill in the art to practice the invention. Since various modifications in detail, material and arrangements of parts are within the spirit of the invention herein disclosed and described, the scope of the invention should be limited solely by the scope of the claims.

I claim:

1. A plastic pipe beam support comprising:

a pair of substantially identical, oppositely disposed brackets for engaging laterally opposite flanges of an I-beam, each bracket including a U-shaped base portion and a flat-upstanding lug portion having a recess cut out from an upper margin thereof for receiving and supporting a pipe;

a U-bolt with threaded ends spaced apart a distance greater than the outer diameter of the pipe, capable of partially encompassing the pipe and equipped with matching threaded nuts;

an angle iron that extends longitudinally a distance greater than the distance between the threaded ends of the U-bolt and comprising a vertical support portion and a horizontal shelf portion, the vertical support portion having a first pair of longitudinally-spaced apertures for receiving threaded means, and the shelf portion having a second pair of longitudinally-spaced apertures for receiving the threaded ends of the U-bolt; and a pair of threaded means inserted through oppositely disposed lug portions of the brackets and through the second pair of apertures of the angle iron, for clamping and unclamping the brackets to the beam.

2. The support of claim 1 wherein the threaded means includes threaded rods equipped with matching threaded nuts.

* * * * *